Feb. 11, 1958 H. C. FOX 2,822,937
SHUTTLE CAR MECHANISM
Filed April 10, 1956 3 Sheets-Sheet 3
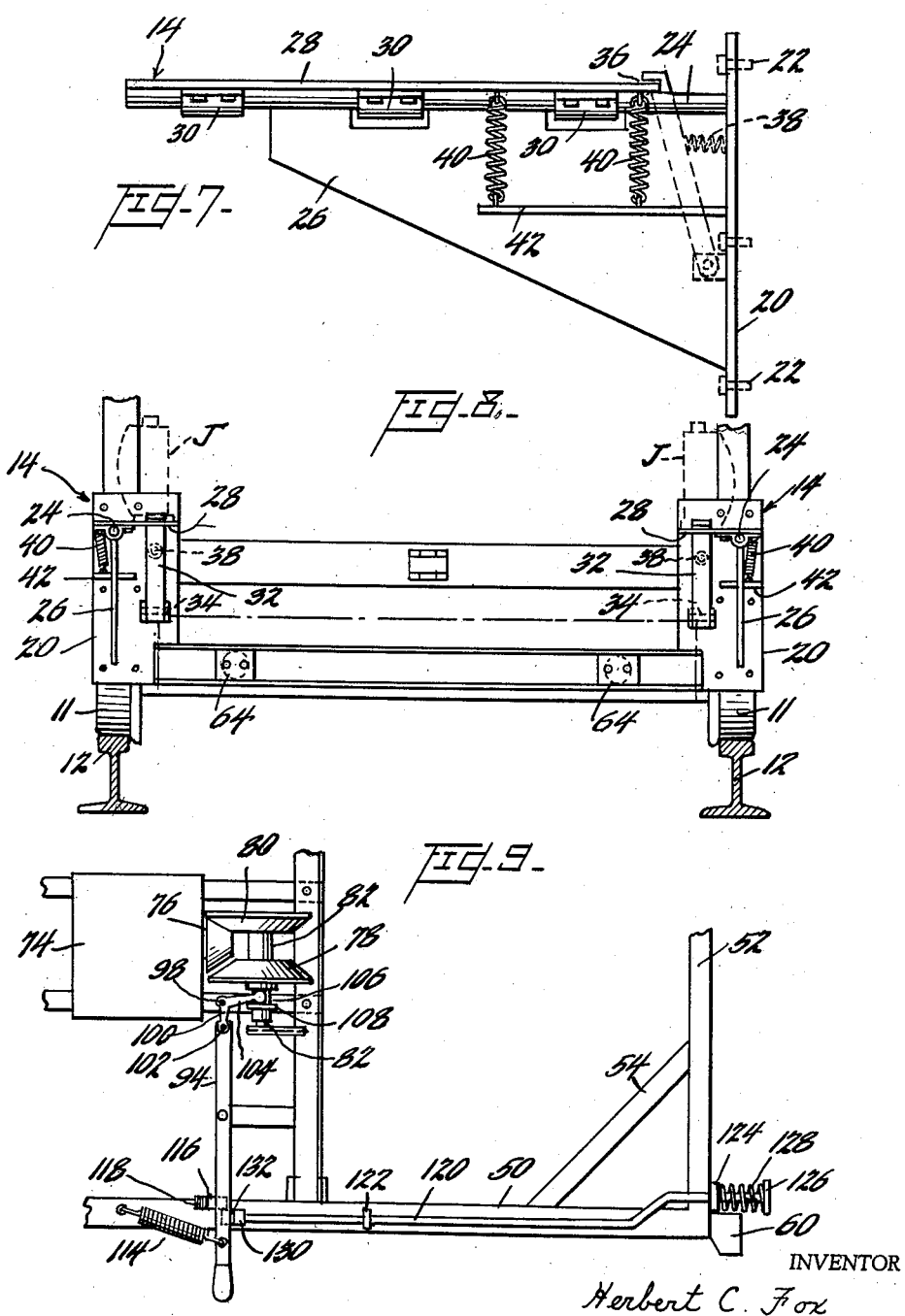
INVENTOR
Herbert C. Fox
BY Watson, Cole, Grindle & Watson
ATTORNEYS United States Patent Office 2,822,937
Patented Feb. 11, 1958

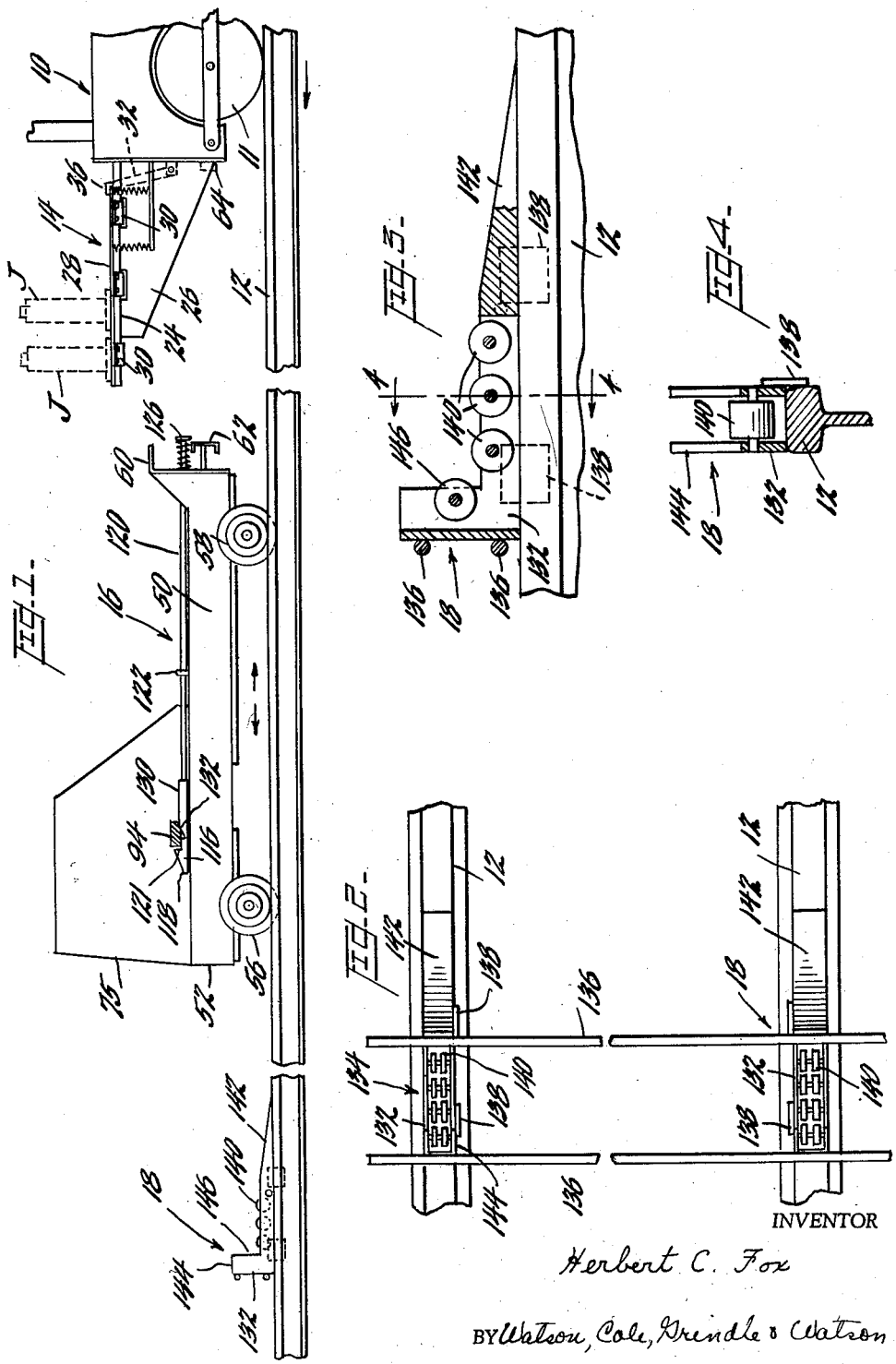

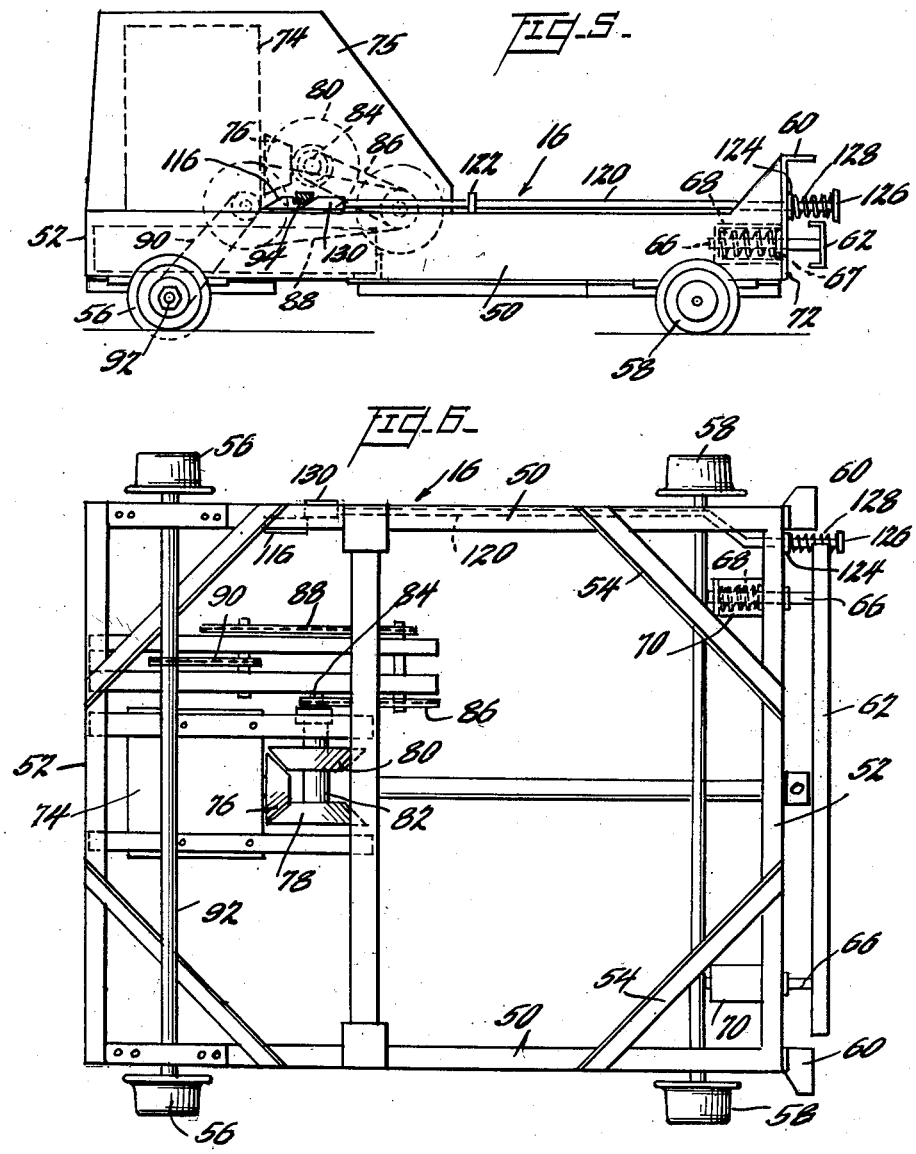

2,822,937
SHUTTLE CAR MECHANISM
Herbert Clyde Fox, Greensboro, N. C.
Application April 10, 1956, Serial No. 577,358
5 Claims. (Cl. 214—42)

This invention relates to a collision actuated shuttle car mechanism which, though not limited to any specific field of use finds particular utility in the field of railroad ballast tamping.

In the operation of applying and tamping ballast around and beneath the ties of railroad tracks it is necessary to jack up the rails and their associated ties at spaced points prior to passage over these rails of the tamping machine or vehicle. As the tamper completes its work in connection with these raised sections of the track the jacks are removed and transported to a location further along the track where a crew of workers reposition them in readiness for the approaching tamping machine. This operation of picking up the jacks from the section of track just tamped and conveying them to the new location, has customarily been accomplished by a shuttle car under the control of an operator.

One of the primary achievements of the instant invention consists in the elimination of the operator for the shuttle car. This is achieved by rendering the shuttle car completely automatic through each operational cycle to move rearwardly to the tamper, where its rearward movement will be arrested by collision with the tamper, and as an incident to the collision the propelling mechanism of the shuttle car will be put in reverse to institute its return movement.

In accordance with the invention, a collision, preferably in the form of a cushioned impact between the shuttle car and the tamper, is utilized for bringing the shuttle car to a stop and also for actuating the reversing mechanism of the shuttle car to initiate its return movement. The propelling means of the shuttle car is preferably reversed substantially as the car comes to rest in order to avoid the imposition of undue stress and shock on its propelling means. This arrangement also eliminates the necessity for a braking system to bring the car to a stop in proper position.

Preferably also, each impact between the shuttle car and tamper brings the shuttle car to rest in accurate position beneath a load support or carrier projecting forwardly from the tamper on which the used jacks will be placed by workmen at the tamper. As an incident to the collision between the tamper and shuttle car, a latching means normally holding the load support in operative position will release the load support to permit discharge of the several jacks into the shuttle car for subsequent transportation to a new point of use along the track on the return trip of the shuttle car.

In the preferred form of the invention, the control element for the propelling means of the shuttle car is manually positioned at the start of each operational cycle to initiate rearward movement of the car toward the tamper and is latched in such position against the action of resilient means urging it toward reversing position. A trip mechanism actuated by engagement with the tamper then is operative to release the controlling element from the latching means, for movement to reversing position.

A further feature of the invention consists in the particular arrangement of the load support or carrier for cooperation with the shuttle car; and in the arrangement of the load carrier in such manner that it automatically returns to and is latched in load supporting position following each discharge of its load. A still further feature consists in the novel arrangement of a bumper adapted for manual positioning at various points along the track to automatically arrest the return movement of the loaded shuttle car while permitting continued rotation of its drive wheels.

The foregoing, as well as other incidental objects and advantages, are obtained by the preferred embodiment of the invention illutrated in the accompanying drawings, in which:

Figure 1 is a side elevation of the shuttle car, the front portion of the tamper with its load support and the bumper for limiting the return movement of the shuttle car, these parts all being shown as operatively positioned on a railway track which is foreshortened by the breaking away of portions of the track;

Figure 2 is a plan view of the bumper, as operatively positioned on the track;

Figure 3 is a somewhat enlarged side elevation of the bumper with parts broken away to show the arrangement of the anti-friction rollers therein;

Figure 4 is a cross-section on the line 4—4 of Figure 3;

Figure 5 is a somewhat enlarged side elevation of the shuttle car;

Figure 6 is a bottom plan view of the shuttle car;

Figure 7 is a side elevation of one of the load supporting shelves or carriers which is adapted to be supported on and project from the forward end of the tamping machine, as illustrated in Figure 1;

Figure 8 is a front end view of the tamping machine having the load carriers or supports operatively positioned thereon; and Figure 9 is a fragmentary plan view of the shuttle car.

Referring now in detail to the accompanying drawings, the tamping machine 10, which may comprise a conventional self-powered Matisa tamper having flanged wheels 11, whereby it is adapted for movement along the rails 12 in the direction of the arrow in Figure 1. As it progresses along the rails it will function in a known manner to tamp ballast between and beneath the railroad ties, the entire track, including the ties, having been first raised and supported by usual jacks preparatory to the passage of the tamper over the track.

The jacks will normally be positioned in transversely opposed relationship on opposite sides of the track and as the tamper 10 passes each such pair of jacks the workmen accompanying the tamper will remove the jacks and place them on the load carriers or supports of the invention, each generally designated 14. It will be seen that these supports project forwardly from the tamper and are elevated substantially above the rails 12. The arrangement is such that the automatically reversible shuttle car of the invention, generally designated 16, may move beneath the load supports 14 to be in substantial vertical registry therewith when it collides with the tamper 10, at which time it will actuate the load supports 14 to dump the jacks J into the shuttle car. The propelling mechanism of the shuttle car 16 will have been reversed as an incident to such collision whereupon the shuttle car will be caused to return with its load to a point further along the track in advance of the tamper 10 where the jacks J may be removed from the shuttle car and re-positioned in operative relation to the track 12 by a team of workmen in advance of the tamper. For the purpose of arresting the return movement of the shuttle car 16 at any predetermined point along the track, there is provided a novel bumper structure generally designated 18, which is adapted to bring the shuttle car to a position of rest without interrupting the rotary movement of its drive wheels and without necessitating shutting off of its motor or manipulation of its transmission.

The foregoing sets forth the general arrangement and mode of cooperation of the several components utilized with the invention merely for the purpose of promoting an early overall understanding of the general operation of the invention.

Returning now to a more detailed description of the load-carriers or supports 14, it will be seen by reference of Figures 1 and 7 that there are provided two such load carriers. These are positioned at the front end of the tamper in forwardly projecting relationship substantially over the respective rails 12 so that the jacks J retrieved from beneath the rails on either side of the track may be conveniently lifted by the workmen and placed on the respective shelves or carriers 14. Each such carrier will preferably comprise a vertical base plate 20 adapted to be bolted flush against the forward end of the tamper 10 at one side thereof by means of the bolts 22 shown in Figure 7. Projecting forwardly from the tamper 10 in the direction of its travel is a generally horizontal pintle 24 which is rigidly secured on the base plate 20 and reinforced against vertical deflection by a vertical reinforcing plate or web 26 welded both to the pintle 24 and the supporting plate 20. A supporting shelf 28 is hingedly supported as at 30 on pintle 24 with its major load supporting portion projecting inwardly from the pintle 24 toward the center line of the tamper 10. A latch 32 associated with each shelf 28 is hingedly supported at 34 on its respective plate 20 for vertical swinging movement to and from operative engagement with the rear edge of its associated shelf 28. At its free upper end, each such latch 32 is provided with a latching notch 36 for receiving the rear edge of the shelf 28 and securing it in a generally horizontal load supporting position about its pintle 24. It will be seen that each such latch 32 is resiliently urged into operative engagement with the shelf 28 as by means of a compression spring 38 interposed between said latch and its associated plate 20 in spaced relation to the hinged mounting 34 of the latch.

These latches are so arranged and positioned that they may be engaged and swung rearwardly by the shuttle car 16, thereby releasing the shelves 28 so that the weight of the jacks J on these shelves may swing them downwardly about the pintles 24 to a load discharging position.

For the purpose of automatically returning the shelves to a load carrying position and effecting their retention in such position, it is desirable to provide return springs such as 40 connected under tension between the outer edge portion of each such shelf 28 and a fixed ledge or bracket 42 carried by its associated web 26. It will be seen that after the shelf or load carrier 28 has been swung downwardly to load discharging position by the weight of the jacks to transfer the jacks into the shuttle car 16, the shelf in each case will then be returned to a horizontal load carrying position by action of the springs 40 and will be automatically latched in such position by the latch 32 under the actuation of the associated spring 38.

The shuttle car 16 will normally be a relatively light construction embodying a generally rectangular frame consisting of the parallel sides and ends 50 and 52, respectively. Such frame may be reinforced by suitable diagonal braces 54 in well-known manner and will, of course, be supported for movement along the rails 22 on usual flanged wheels 56 and 58. In the present instance the wheels 56 at the forward end of the shuttle car constitute its drive wheels and are adapted to be driven in either direction, that is, either rearwardly toward the tamper 10, or forwardly for return movement from the tamper.

For the purpose of releasing the latches 32 of the load carriers the shuttle car 16 is provided with upwardly and rearwardly projected contact plates or elements 60 on opposite lateral sides thereof.

Also for the purpose of cushioning the impact between the shuttle car and the tamper a spring cushioned bumper 62 may be supported at the rear end of the shuttle car for operative engagement with rubber bumper pads 64 on the front of the tamper 10. The bumper 62 is supported by laterally opposed plungers 66 slidable through openings in the rear end member 52 of the shuttle car frame. The plungers 66 work against compression springs 68 disposed within housings 70 fixed to the shuttle car frame. It will be seen in Figure 5 that the springs 68 are normally compressed between the ends of their respective housing and abutments 72 on the rods 66.

Reversible self-propelling means for the shuttle car 16 may be of a conventional commercially available type, comprising a small internal combustion motor 74 carried at the front end of the shuttle car 16 within a housing 75 and transmitting power to the front wheels 56 of the shuttle car through a usual reversing mechanism which is exemplified by the frictional gear elements illustrated in the accompanying drawings. Such mechanism comprises the frictional driving cone 76 keyed on the output shaft of the motor 74 for alternate engagement with either of the driven cones 78 or 80. These cones 78 and 80 are both keyed on a sleeve 82 and the sleeve 82 in turn is slidably keyed or splined on a driven shaft 84 which in turn is connected through the chain drives 86, 88 and 90 to the drive shaft or axle 92 on which the drive wheels 56 are keyed. Since the specific arrangement of the reversing mechanism 76, 78 and 80 and also that of the chain drives 86, 88 and 90 is not essential, but may assume any of various well-known forms, it is not deemed necessary to enter into a further description of such elements.

For the purpose of sliding the sleeve 82 and its associated driven cones 78 and 80 back and forth on the shaft there is provided a control element or lever 94 which is medially fulcrumed on the shuttle car frame at 96 for horizontal swinging movement forwardly and rearwardly and which may be linked in any suitable well-known manner to the sleeve 82 to cause axial movement of such sleeve responsive to swinging of the lever 94. The linkage between the lever 94 and sleeve 82 constitutes no part of the invention, but may be of any usual type, as exemplified in Figure 9, and/or as disclosed in prior United States patents such as Woodhead 1,262,897. In Figure 9 such linkage is shown as comprising a bell crank lever fulcrumed at 98, and having one arm 100 pivotally connected at 102 to the lever 94. The other arm of said lever is in the form of a shifting fork 104 having its furcation operatively received in the annular groove 106 of a collar 108 coaxially fixed on sleeve 82. Thus by appropriate swinging of the lever 94 either of the driven cones 78 or 80 may be brought into operative driving engagement with the driving cone 76.

Normally, the lever 94 is resiliently urged rearwardly, or to the left in Figure 5, to cause rearward movement of the car 16 toward tamper 10. This is accomplished by means of a spring 114 connected under tension between the lever and the frame of the shuttle car. However, the lever may be manually positioned to cause rearward movement of the shuttle car toward the tamper and may be retained in such position by means of a latch element 116 fixed on the adjoining side frame member 50 of the shuttle car. Preferably, the latch member has an inclined cam face 118 at its rearward end facilitating the manual movement of the lever upwardly and over such latch to descend on the forward side thereof, in which position it abuts against a forwardly presented vertical face of the latch designated 120.

For the purpose of unlatching the lever 94 and permitting reversal of the shuttle car propelling means for subsequent return movement, there is provided a suitable trip mechanism actuated by collision of the shuttle car with the tamper or other fixed obstacle in the path of movement rearwardly of the shuttle car. Such trip mechanism comprises a trip rod 120 slidable longitudinally through guides 122 and 124 on the shuttle car frame. At its rearward end this trip rod 120 projects somewhat rearwardly of the shuttle car frame and terminates in a button or enlargement 126 positioned for actuating engagement with the front end of the tamper. A spring 128 positioned about the rod 120 under compression between the guide 124 and the enlargement 126 normally projects the rod rearwardly. At its forward end the rod 120 carries a sliding cam 130 having an inclined cam surface 132 adapted for movement beneath the lever 94 to deflect such lever upwardly past the abutting face 120 of latch 116. The sliding cam 130 and the extent of movement of the rod 120 on its actuating stroke are such that when the rod 120 is moved responsive to collision between the shuttle car and the tamper, the cam surface 132 will disengage the lever 94 from its latch 116 and permit the spring 114 to automatically swing the lever 94 to a reversing position in which the driven cone 80 is brought into operative engagement with the driving cone 76. It will be seen that this will occur substantially at the time that the shuttle car is brought to a stop incident to its collision with the tamper, thus reducing the stress and shock resulting on the motor 74 and the driving transmission between the motor and driven axle 92.

The bumper mechanism (best shown in Figures 2, 3 and 4) for arresting the movement of the shuttle car at a desired point along the rails comprises a pair of bumper units 132 adapted to rest upon the tops of the respective rails 12 and rigidly interconnected as a unit by transverse bars or rods 136 which are preferably welded to and between these bumper units. In order to position the respective bumper units in vertical registry with the rails and maintain them in such registry at all times, they are provided with depending guide plates 138 projecting downwardly preferably on the insides of the respective rails and slidably engaging same. The entire bumper device 18 thus is arranged so that it may be manually positioned along the rails at any desired point to arrest the return movement of the shuttle car 16 at such point.

Each of the bumpers 134 is provided at its forward portion with a longitudinally extending slot or socket in which are freely rotatably journaled a plurality of anti-friction rollers 140 and at its forward end each such bumper comprises a forwardly and upwardly inclined ramp portion 142 for guiding the drive wheels 56 of the shuttle car upwardly from the track and onto the rollers 140. At the forward end of each bumper 134 on the opposite side of the rollers 140 from the ramp 142 is an upwardly projecting integral stop 144 having a rearwardly facing recess in which is journaled an anti-friction roller 146 for engagement with the drive wheel 56 of the shuttle car 16.

Thus, it will be seen that as the shuttle car approaches the end of its return trip, it will be guided by the ramp 142 up on to the rollers 140 and will finally be brought to a stop by abutment of its drive wheels against the roller 146 and/or the stop elements 144. Since the drive wheels will be then in engagement only with the freely rotatable elements 140 and 146, when the vehicle is brought to rest, it will be seen that these wheels may continue to rotate uninterruptedly.

In the overall operation of the mechanism here described, the tamping machine 10 moves over a previously jacked-up or elevated section of the track while performing its usual ballast tamping function. As the tamping machine 10 moves past the respective jacks on opposite sides of the track they are removed by workmen accompanying the tamper and positioned on the load carriers 14. It will be noted that the load carriers 14 are each adapted to support and receive a number of jacks J in readiness for transfer to the shuttle car 16.

When the workmen engaged in placing the jacks ahead of the tamper 10 desire to attain these jacks from the platform or load carrier 14, this is done automatically through use of the shuttle car 16. Normally, the shuttle car 16 will be supported at the forward end of its run against the bumper structure 18 where it will be retained at rest regardless of whether its driving wheels 56 are rotating. In order to institute movement of the shuttle car 16 rearwardly toward the tamper 10, and assuming that the drive wheels are being driven in a forward direction, it is necessary only for the workman to grasp the handle of the control lever or element 94 and move it rearwardly or to the right in Figure 5 up over the latch 116 and downwardly into abutting engagement with the forwardly presented operative face 120 of the latch, whereby the latch will function to maintain the lever in a position for causing rearward movement of the shuttle car. The shuttle car may then be pushed off of the rollers 140 to move down the ramp 142 and on to the tracks 12 toward the tamper 10. Upon reaching the tamper 10, it will be seen that the cooperating bumper elements 64 and 62 of the tamper and shuttle car respectively will engage each other and bring the shuttle car to a stop. In this connection it should be pointed out that the shuttle car will be of relatively light construction and low inertia, whereas the tamper will be considerably heavier and will thus have a sufficiently great inertia that it may easily bring the shuttle car to a stop without unduly jarring the tamper or any workmen aboard it.

As an incident to the collision between the shuttle car and tamper, it will be seen that the feeler plates or actuators 60 on the shuttle car will engage and release the respective latches 32 from their associated shelves or load supports 28, thus permitting the load supports to swing downwardly under the weight of the jacks J thereon and empty these jacks into the shuttle car 16. At this time the shuttle car will have its load receiving rear end portion accurately positioned beneath the load supports 14.

Also, as the shuttle car 16 is brought to a stop, the forward displacement of the trip rod 120 resulting from the engagement of its projecting end portion 126 with the tamper 10 will move the cam slide 130 to elevate the control lever 94 above the latch 116. This will permit the spring 114 to immediately swing the lever 94 rearwardly, thereby conditioning the propelling mechanism for the shuttle car to institute a reverse or return movement of same. The shuttle car will then return until stopped by the appropriately stationed bumper structure 18. The jacks J thus delivered by the shuttle car will then be stationed along the track as desired and the shuttle car may be caused to periodically move rearwardly for additional jacks whenever needed. Thus, the invention provides a simple and efficient manner of transporting the jacks between the tamper machine 10 and their desired stations along the railroad track in advance of the tamper machine, while eliminating any necessity for a shuttle car operator.

Obviously, the invention is capable of other embodiments and its several details are subject to variation within the scope of the appended claims.

I claim:

1. The combination comprising a pair of vehicles adapted for relative movement along a track to and from collision with each other, a load carrier supported on one said vehicle for movement between a load supporting position and a load dumping position, releasable latch mechanism normally maintaining said carrier in load supporting position, an upwardly opening load receiving body carried by the other said vehicle for movement beneath said carrier and into substantial vertical registry therewith at the time of a collision between said vehicles, latch release means carried by the said other vehicle for engaging and releasing said latch mechanism incident to collision between said vehicles, a reversible propelling means operatively associated with one of said vehicles, and normally propelling its associated vehicle toward the other vehicle, and a control mechanism for said propelling means operative to reverse said propelling means responsive to a collision between said vehicles.

2. A pair of vehicles adapted for relative movement along a track, a load supporting shelf carried by one of said vehicles and projecting toward the other said vehicle, said shelf being swingable about a generally horizontal axis on its respective vehicle from a generally horizontal load supporting position to a horizontally inclined dumping position, releasable mechanism normally maintaining said shelf in its load supporting position, an upwardly opening load receiving body carried by the other said vehicle at a level for movement beneath said shelf, actuating means carried by the said other vehicle for engaging and releasing said mechanism to transfer the load from said shelf to said body as the body moves beneath the shelf, a reversible propelling means operatively associated with one of said vehicles, and normally propelling said vehicle toward the other said vehicle and a control mechanism for said propelling means operative responsive to a collision between said vehicles for reversing said propelling means.

3. The combination comprising a pair of vehicles adapted for relative movement along a track to and from collision with each other, impact cushioning means carried by one said vehicle for operative engagement with the other, a load carrier supported on one said vehicle for movement between a load supporting position and a load dumping position, a releasable latch normally operatively engaging and maintaining said carrier in load supporting position, resilient means associated with said carrier for returning said carrier from dumping position to load supporting position in operative engagement with said latch, a load receiver, carrier by the other said vehicle for movement beneath said carrier and into substantial vertical registry therewith in the collision positions of said vehicles, latch release means carried by said other vehicle for engaging and releasing said latch, a reversible propelling means operatively associated with one of said vehicles, and normally set to propel its associated vehicle toward the other said vehicle, and a control mechanism for said propelling means operative to reverse said propelling means responsive to a collision between said vehicles.

4. The combination comprising a track, a bumper on said track, a load carrier, means supporting said load carrier over the track at a distance from said bumper for movement between a load supporting position and a load discharging position, a releasable latch normally maintaining said carrier in load supporting position, a shuttle car having front and rear wheels movable along said track between said bumper and said carrier, a load receiving body carried by said car for movement beneath said carrier, a latch release means carried by said car to release said latch when said body is positioned beneath said carrier, a reversible propelling means operatively connected to the rear wheels of said vehicle, a control mechanism carried by said vehicle for engagement with said supporting means to reverse said propelling means, said bumper including a base supported on said track, said base including rollers freely rotatably journaled thereon above the track and ramp means for guiding the drive wheels onto said rollers, and a barrier for arresting the movement of said car with the drive wheels supported on said rollers.

5. A self-propelled reversible vehicle adapted to be stopped and reversed by collision with an obstacle in its path of movement comprising reversible drive means carried by said vehicle and operable to drive said vehicle in either forward or reverse directions, a control lever pivoted on said vehicle and operatively associated with said drive means to condition same for either forward or reverse driving of the vehicle, a spring urging said lever in a direction to condition said means for reverse driving, a stationary detent on said vehicle normally abutting against said lever and maintaining same in position to condition said drive means for forward driving, a trip mechanism comprising a rigid rod longitudinally slidable on said vehicle and projecting forwardly from said vehicle for actuating engagement with and rearward displacement by an obstacle in its path, a sliding cam carried by said rod and disposed for rearward movement beneath said lever to deflect same clear of the detent and permit movement of the lever by said spring to a position to reverse the direction of movement of the vehicle, an upwardly opening load receiving body carried by the vehicle, an impact cushioning means carried by the vehicle for engagement with said obstacle, to bring the vehicle to a stop at substantially the same time said trip means is actuated to permit reversing of the vehicle drive means, a load carrier mounted on said obstacle in a position to overlie said vehicle at the time of collision of the vehicle with the obstacle, said load carrier being movable from a load carrying position to a load releasing position, releasable latch mechanism normally maintaining said load carrier in load supporting position, latch release means carried by said vehicle for releasing engagement with said latch incident to said collision, whereby the load carrier will be caused to transfer its load to said vehicle.

References Cited in the file of this patent

UNITED STATES PATENTS

| | | |
|---|---|---|
| 692,118 | Clift | Jan. 28, 1902 |
| 1,009,072 | Johnson | Nov. 21, 1911 |
| 1,014,197 | Windhoff | Jan. 9, 1912 |
| 1,108,627 | Scholle | Aug. 25, 1914 |
| 1,563,685 | Boys | Dec. 1, 1925 |
| 2,149,710 | Smith | Mar. 7, 1939 |
| 2,179,913 | Bess | Nov. 14, 1939 |
| 2,546,030 | Grewe | Mar. 20, 1951 |